UNITED STATES PATENT OFFICE.

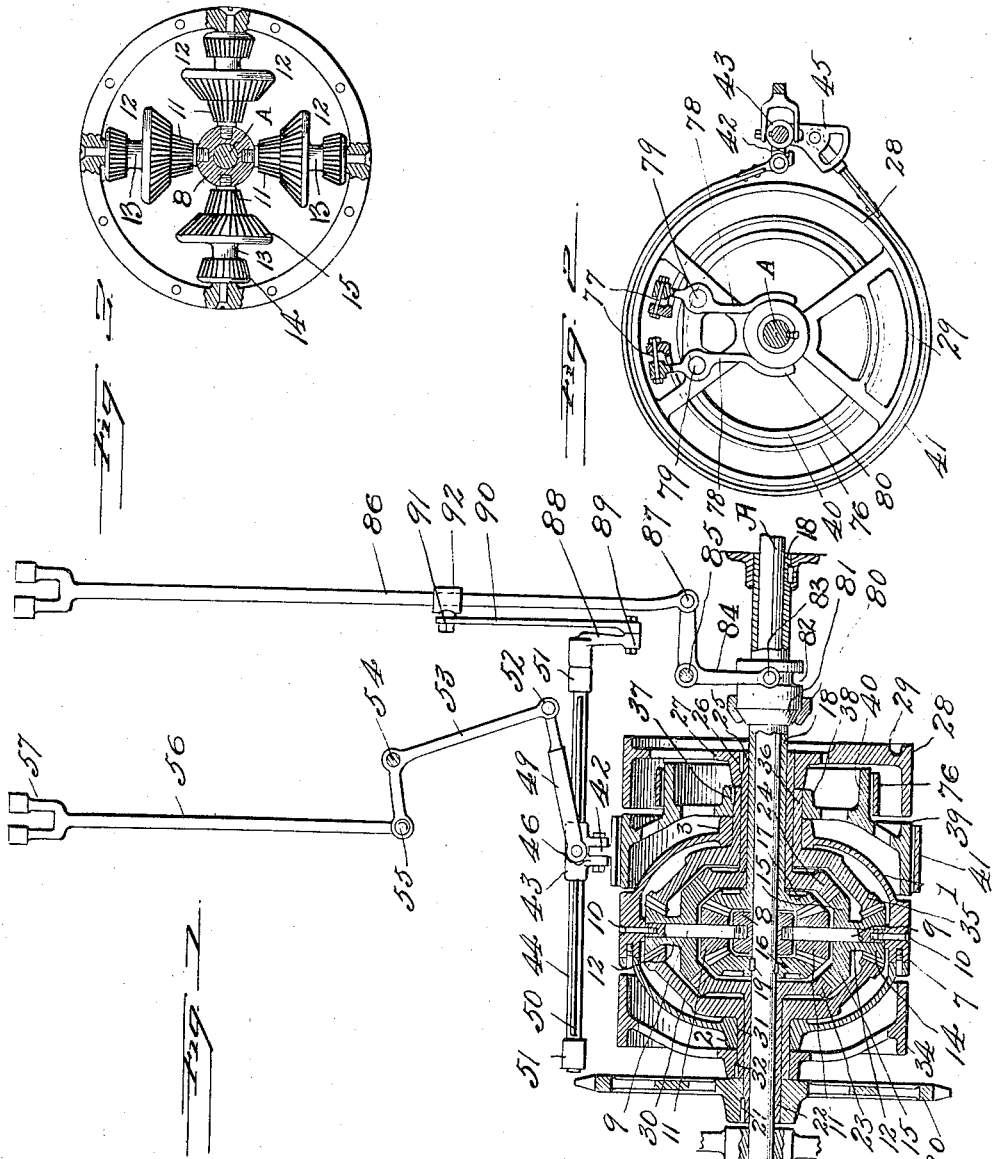

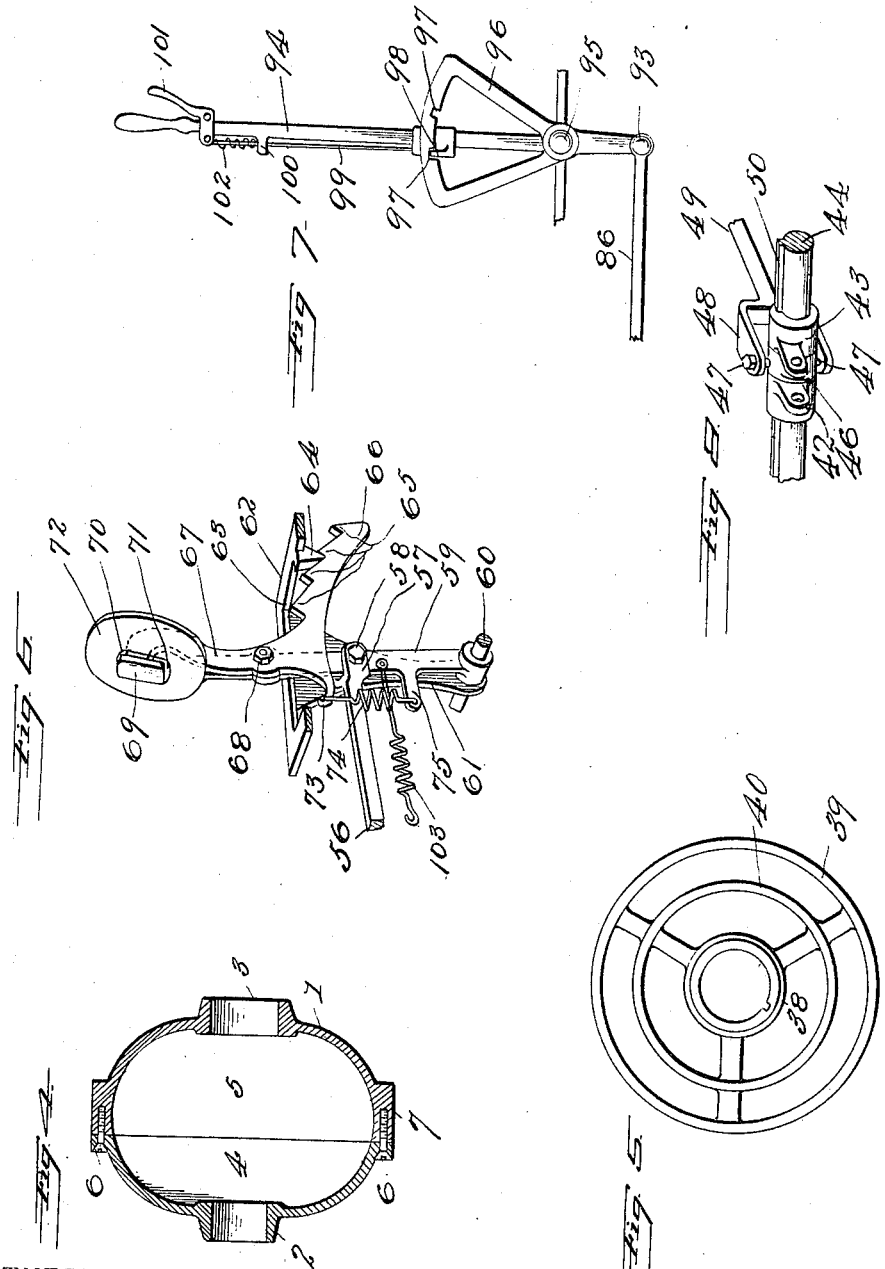

WILLIAM L. FODREA, OF NOBLESVILLE, INDIANA.

POWER-TRANSMISSION GEARING.

948,694.  Specification of Letters Patent.  Patented Feb. 8, 1910.

Application filed July 2, 1906. Serial No. 324,521.

*To all whom it may concern:*

Be it known that I, WILLIAM L. FODREA, citizen of the United States, residing at Noblesville, in the county of Hamilton and State of Indiana, have invented certain new and useful Improvements in Power-Transmission Gearing, of which the following is a specification.

This invention relates to new and useful improvements in variable speed gearing and it particularly pertains to a mechanism embodying as an entirety a combination of transmission pinions and gears.

The primary object of the present invention is to provide a power transmission mechanism occupying less space than those ordinarily employed, and of less weight.

It is a further object of the invention to provide a structure which is simple in operation and in which but two levers are involved for regulating the varying degrees of speed.

It is a further object of the present invention to combine as an integral part of the gearing and having positive connection with the elements thereof, a brake for the gearing by which the engine is allowed to run idle.

It is a further object of the invention to provide beveled gears which can be adjusted with wear and which add more strength to the structure than possessed by the ordinary gearing, due to the increased bearing surface.

The invention aims as a further consideration to provide as an integral part of the brake, a casing which serves as an oil chamber for the bearing surfaces of the gears.

It is finally the object of the invention to provide a mechanism in which material changes may be made in adapting the structure to the different types of machine, without sacrificing or departing from the basic principle of construction.

The detailed construction will appear in the course of the following description in which reference is had to the accompanying drawings forming a part of this specification, like characters designating like parts throughout the several views, wherein, Figure 1 is a central longitudinal section illustrating an apparatus constructed in accordance with my invention. Fig. 2 is an end view thereof partly in section. Fig. 3 is a side elevation partly in section showing the arrangement and construction of the gears, and the brake drum carried thereby. Fig. 4 is a longitudinal section of the oil case detached from the apparatus and with which the brake drum is combined as a composite element. Fig. 5 is a side elevation of the high speed and the third forward speed drum, embodied in an integral casting. Fig. 6 is a detailed perspective view of a foot lever for operating the variable speed brake. Fig. 7 is a side elevation of a hand lever for operating the high speed clutch and by which the variable speed brake is set for operative engagement with a selected drum controlled thereby, and Fig. 8 is a fragmentary detailed perspective view illustrating the slidable connection between the variable speed brake and the rocker shaft for setting the same.

In the practical embodiment of my invention the letter A designates the shaft to which power is to be transmitted from the engine. The shaft A is shown in Fig. 1 and may be the axle of the vehicle or other machine to be driven or it may be operatively connected with such axle to drive the same.

Surrounding the shaft A is an oil chamber 1 which is of substantially oval shape in cross section and is formed on each side thereof with enlarged hubs 2 and 3 which surround the shaft and are spaced away therefrom to permit of the passage therebetween of the various sleeves carried by the controlling gears. For the sake of accessibility to the parts the chamber 1 is formed in sections 4 and 5 which are positively united by screws 6 or other approved fastening devices. Said sections are formed adjacent their plane of greatest diameter with a portion which is flat in cross section and which serves to provide on the chamber 1 a peripheral brake drum 7.

Loosely mounted upon the shaft A adjacent the drum 7 is a hub 8 provided at desired intervals with radially extending posts 9 which have positive connection at their upper ends with the drum 7 by means of fastening screws 10. Mounted upon the posts 9, adjacent the hub 8 are transmission pinions 11 and directly beyond said transmission pinions, transmission gears 12, formed with a reduced central portion 13 and with outer and inner beveled transmission pinions 14 and 15, the pinion 15 being of proportionately greater size than the pinion 14 as will be hereinafter set forth. The pinions 11 mesh with pinions 16 and 17, mounted, as shown in Fig. 1 upon the left and right hand sides of the hub 8 respectively. The pinion 17 is provided with a rearwardly extending sleeve 18 which projects at some distance through the hub 3 of the casing and through the member 81, said sleeve 18 being suitably secured to hold the gear 17 stationary. The said gear 17 thus serves as the stationary element for the right side of the gearing. The shaft A is keyed as at 19 to the pinion 16 which serves as the rotative element for the left side of the gearing, and through which the said shaft is rotated from the equalizing gears 11 inasmuch as the opposite gear 17 is held stationary as described.

Power for driving the shaft A is transmitted to the gearing by means of a gear 20 which may be, as preferred and according to the exigencies of circumstances, a bevel, sprocket or spur gear. The gear 20 is keyed as at 21 to a sleeve 22 concentrically projecting within the hub of said gear and surrounding the shaft A. The sleeve 22 forms an integral part of a bevel transmission gear 23, which meshes with the pinion 15 of the gear 12. The gear 23 serves as a direct power transmitting element, and through the transmission pinions 11, 14 and 15 and the pinions 16 and 17 above mentioned transmits its power at varying and selected degrees of speed to the shaft A. The pinions 15 mesh with a bevel controlling gear 24 of the same dimension as, and disposed opposite to the gear 23. The gear 24 is formed with an integral sleeve 25 surrounding the sleeve 18 of the gear 17. The sleeve 25 is keyed as at 26 to the hub 27 of a drum 28 which, as will be hereinafter described, constitutes the second low speed drum and is provided with a balancing weight 29. The pinion 14 meshes on the left hand side with a controlling gear 30 provided with an integral sleeve 31 projecting through the hub 2 of the chamber 1 and exteriorly of said hub keyed as at 32 to the hub 33 of a reversing drum 34. The transmission pinions 14 on their right hand side mesh with a controlling gear 35 which carries an integral sleeve 36 surrounding the sleeve 25 of the pinion 24. The sleeve 36 is keyed exteriorly of the chamber 1 as at 37 to the hub 38 of a third low speed drum 39 with which an inner concentric high speed drum 40 is cast integral.

The varying degrees of speed are attained, as desired, by the proper actuation of the drums 28, 39 and 40. The drums 28 and 39 which represent the second and third low speeds, as well as the brake drum 7 and the reversing drum 34 are designed to be engaged by a brake 41 of conventional form, which at its one end has connection as at 42 with the depending leg of a sleeve 43 slidably mounted upon a rocker shaft 44, said brake at its other end having connection with the horizontal leg 45 of said sleeve as shown in Fig. 2. Centrally of the sleeve 43 is an annulus 46, which is freely rotatable upon said sleeve and has pivotal connection by pins 47 with the bifurcated end 48 of a link 49. The sleeve 43 is provided with a keyway which receives a longitudinal rib 50 formed upon the shaft 44. The shaft 44 is mounted in supporting bearings 51 and is rocked in said bearings by mechanism to be described. In its rocking movement, the sleeve 43 is moved with said shaft to increase or decrease the tension of the band brake 41 and in this action the ring 46 eliminates the strain upon the elements directly or indirectly connected with said sleeve. The link 49 is pivoted at its end as at 52, to one leg of a bell crank lever 53 which is fulcrumed to a stationary object as at 54 and has pivotal connection at the end of its other leg as at 55 with a link 56 terminating in a bifurcated end 57. The link 56 projects forwardly of the gearing and has connection at its end 57 by a pivot 58 with a lever 59 fulcrumed as at 60 to the stationary depending leg 61 of a supporting bracket 62. The bracket 62 is provided with a cut-away portion 63 for the passage of the lever 59 and its appurtenant elements therethrough and upon one edge of said cut-away portion the bracket is formed with an integral depending catch 64. The catch 64 is designed to hold the lever 59 in any selected position to which it may be moved and to this end engages in the notches occurring between teeth 65 provided upon the rearward extension 66 of a pawl 67. The pawl 67 is fulcrumed to the lever 59 as at 68 and terminates at its upper end in an enlarged head 70 which projects through an opening 71 formed in the foot plate 72 of said lever 59. Adjacent to the extension 66, the pawl 67 is provided with an integral hook 73 with which one end of a retractile coil spring 74 has connection, the other end of said spring being connected to an integral forwardly extending arm 75 formed in the lower portion of the lever 59. It will be readily apparent that movement of the lever 59 will serve to slide the sleeve 43 upon the rib 50 by virtue of the connections between said lever and said sleeve as above set forth.

The high speed drum 40 is designed to be engaged by a clutch 76, having connection at its end as indicated at 77 in Fig. 2 with the upper ends of arms 78 arranged in closely associated relation upon the frame of the drum 28. The arms 78 are fulcrumed upon said frame as at 79 and are designed to be moved toward and away from one another in increasing or decreasing the tension of the band clutch 76. To this end said arms are each formed with lower ends curving in inwardly and oppositely as at 80 and engaging a cone shaped operating member 81 slidably mounted upon the stationary sleeve 18. The member 81 is formed with a peripheral groove 82 within which is loosely engaged the bifurcated end 83 of a bell crank lever 84 fulcrumed as at 85 to a stationary object. The lever 84 is operated from a reciprocating link 86, and to this end has pivotal connection with said link as at 87. Simultaneously with the forward movement of the member 81 to tighten the band clutch 76, the band brake 41 is designed to be slackened, irrespective of the particular clutch with which it is engaged. To effect this operation it is necessary to have an actuation of the rocker shaft simultaneously with the forward movement of the member 81 and to this end connections are employed between the shaft 44 and the link 86 comprising a lever 88 rigidly mounted upon the end of said shaft and fulcrumed as at 89 to an auxiliary link 90 which in turn is fulcrumed at 91 to a sleeve 92 adjustably positioned upon the link 86. The link 86 is manually controlled in its movement and to this end has pivotal connection at its forward extremity as at 93 to a lever 94 pivoted as at 95 to a stationary object provided with a quadrant 96. The quadrant 96 is formed in its curved part with internal notches 97 designed to receive a pawl 98, carried by a rod 99 slidable through an apertured lug 100 upon the lever 94. A pivoted auxiliary handle 101 is provided for depressing the rod 99 to disengage the pawl 98 from the teeth 97, said rod being normally raised to maintain said pawl in engagement with said teeth by an expansive spiral spring 102 in the well known manner. The lever 94 and its appurtenant elements are illustrated in Fig. 7 as above intimated.

In operation I will first state the general coöperative action of the gears without detailing the operation of the levers and clutch and brake. When the brake 41 is engaged with any one of the drums adjacent thereto, the clutch 76 is not engaged with the drum 40 and vice-versa. In the use of the brake 41 to effect a second low speed transmission, said brake is moved adjacent to the drum 28 and is tightened upon said drum by the mechanism provided therefor. In this operation the drum 28 and the gear 24 connected therewith are held stationary. The power will be applied to the shaft A from the gear 20, the gear 23, the transmission pinion 15, the transmission pinion 11 and the pinion 16 with a speed proportionate to the ratio between the diameters of the transmission pinion 15 and the controlling gear 24, about which said transmission pinion will have a rotary movement. When the brake 41 is tightened about the drum 39, said drum will be held stationary in the manner described and the power will be applied to the shaft A from the gear 20, pinion 23, transmission pinion 15, transmission pinion 11, and pinion 16 at a speed proportionate to the ratio between the diameters of the transmission pinion 14 and the controlling gear 35 which is keyed to the hub of the drum 39. When the brake drum 7 is held stationary all the parts run idle without effecting a movement of the shaft A. When the drum 34 is held stationary the shaft A will be rotated in a reverse direction at a speed equal to that attained by the use of the second low speed drum 39. In this actuation, power will be applied to the shaft A from the gear 20, gear 23, transmission pinion 15, transmission pinion 11 and pinion 16 at a speed proportionate to the ratio between the diameters of the pinion 14 and controlling gear 30. When the clutch 76 is tightened about the drum 40, the brake 41 will be slack as above intimated. In this relation of the parts a higher speed transmission than those before described will be effected and the power will be applied to the shaft A from the gear 20, gear 23, transmission pinion 15, controlling gears 24 and 35, transmission pinion 11 and gear 16. The last described transmission is possible because corresponding gears are proportioned in ratio so that when all the parts are in actuation, the various gears will move at the same speed.

As disclosed in the drawings the ratio between the diameters of the gears as set forth is as follows: With respect to their diameters transmission pinion 14 is to transmission pinion 15 as pinion 11 is to gears 16 or 17: as gear 24 is to gear 35 and as gear 23 is to gear 30. It must be borne in mind that the gears not in use will run idle under all conditions and that when the high speed clutch is on, the drum 39 and gear 35 connected therewith will rotate with the drum 28.

In effecting the operation of the clutch and brake, the levers are operated in the following manner: Assuming that it is desired to actuate the gearing from the high speed drum. The hand lever 94 is then pushed forward upon its fulcrum and locked in the forward notch 97 by the pawl 98 in the manner above set forth. In this movement of the hand lever, the link 86 will be reciprocated rearwardly and will operate the bell crank 84 to move the cone 81 toward the drum 28. In this movement of the cone 81 the lower ends of the arms 78 will be spread apart and the upper ends will be drawn together, thus tightening the clutch 76 upon the drum 40. Simultaneously with this operation, the shaft 50 will be rocked in its bearings 51 by its connection with the lever 88 which is swung by the link 90 carried by the link 86, and having movement therewith.

When the shaft 50 is thus rocked the ends of the brake 41 will be spread apart through their connections as set forth, and said brake will be disengaged from the adjacent drum. The high speed clutch can be employed irrespective of the position of the brake 41 and the said brake is automatically disengaged upon the actuation of the high speed clutch. As shown in Fig. 1 the brake 41 is disposed adjacent to the drum 39 and if the clutch 76 is thrown on the brake 41 will be disengaged from said drum, but without any movement with relation thereto so that when the clutch is disengaged, the brake will be engaged with the same drum with which it was engaged immediately prior to the employment of the high speed drum. Of course it is optional with the operator as to whether the brake 41 shall remain in the same position during the employment of the clutch. The brake 41 is moved to the desired drum with the sleeve 43, which latter element has a sliding movement upon the shaft 50 under the actuation of the foot lever 59. The foot lever 59 in its most forward position, will set the link 56 so that the brake 41 will rest upon the second low speed drum 28. Said lever is normally maintained in this position by the employment of a strong spring 103 as indicated in Fig. 6. When the lever is depressed, it will move the sleeve 43 and the brake 41 successively over the third low speed drum 59, brake drum 7 and reversing drum 34, and vice-versa when the lever 59 is returned in an opposite direction by the spring 103. In the manipulation of the lever 59 the operator's foot will engage the enlarged head 69 of the pawl 67 and maintain said pawl out of engagement with the tooth 64. The number of teeth 65 will correspond to the number of drums to be controlled by the foot lever and the position of the brake 41 and consequently the transmission employed will be determined by the particular tooth which happens to be engaged with the catch 64.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. A power transmission gearing embodying the combination with the driven shaft and a bevel pinion keyed thereupon, a hub loosely mounted upon said shaft, posts carried by said hub, transmission pinions mounted upon said posts and engaging said pinion, a transmission gear mounted upon said shaft and driven from the engine, a gear mounted upon said shaft and confronting said pinion, said gear being designed to engage said transmission pinions, a plurality of controlling gears mounted upon said shaft in confronting relation, brake drums severally connected with said last named gears, and transmission pinions mounted upon said posts and designed to severally engage respectively with said last named controlling gears.

2. A power transmission gearing comprising the combination with a shaft, of a hub loosely mounted thereupon and provided with radially extending posts, said hub being designed to rotate about said shaft, transmission pinions connecting said hub and said shaft whereby rotary movement of the former will be transmitted to the latter, integral castings mounted upon said radial posts and individually formed with a plurality of pinions of varying sizes, controlling gears loosely mounted upon said shaft and designed to engage severally the respective pinions of said castings and braking elements severally carried by said controlling gears.

3. A power transmission gearing comprising the combination with a shaft, of a hub loosely mounted thereupon and provided with radially extending posts, said hub being adapted to rotate upon said shaft, transmission pinions connecting said hub and said shaft whereby rotary movement of the former will be transmitted to the latter, transmission pinions mounted upon said radial posts and having an interconnected relation, said last named transmission pinions being of varying sizes, controlling gears loosely mounted upon said shaft at one side of said hub and designed to severally engage said last named transmission pinions, a driving gear loosely mounted upon said shaft on the opposite side of said hub, a reversing gear mounted upon said shaft on the same side of said hub as said driving gear, said driving gear and said reversing gear severally engaging a respective transmission pinion, and braking elements carried by said controlling gears and said reversing gear.

4. A power transmission gearing comprising the combination with a shaft, of a hub loosely mounted thereupon and provided with radially extending posts, said hub being adapted to rotate upon said shaft, transmission pinions connecting said hub and said shaft, whereby rotary movement of the former will be transmitted to the latter, transmission pinions mounted upon said radial posts and having an interconnected relation, said last named transmission pinions being of varying sizes, controlling gears loosely mounted upon said shaft at one side of said hub and designed to severally engage said last named transmission pinions, a driving gear loosely mounted upon said shaft on the opposite side of said hub, a reversing gear mounted upon said shaft on the same side of said hub as said driving gear, said driving and said reversing gears severally engaging a respective one of said transmission pinions and braking elements carried by said hub, said controlling gears and said reversing gear.

5. A power transmission gearing, comprising the combination with a shaft, of a pinion having operative connection therewith for driving the same, a transmission gear, a plurality of transmission pinions of varying sizes, having operative connection with said transmission gear and said shaft pinion, said transmission pinions being mounted to move simultaneously at the same rate of speed, a plurality of controlling gears of proportionate sizes, severally engaging a respective one of said transmission pinions, and a braking device for engagement with said transmission pinions, and with a selected one of said controlling gears, substantially as described.

6. A power transmission gearing, comprising the combination with a shaft, of a pinion having operative connection therewith for driving the same, a transmission gear, a plurality of transmission pinions of varying sizes, having operative connection with said transmission gear, and with said shaft pinion, said transmission pinions being mounted to move simultaneously at the same rate of speed, a plurality of controlling gears of proportionate sizes severally engaging a respective one of said transmission pinions, a braking device for engagement with a selected one of said controlling gears, and a clutching device carried by one of said controlling gears, for engagement with a second controlling gear, to lock the two together, substantially as described.

7. A power transmission gearing, comprising the combination with a shaft, of means 16 having operative connection therewith for driving the same, a transmission gear 23, a plurality of transmission pinions 11 14 15 of varying sizes, having operative connection with said transmission gear 23, and with said driving means 16, said transmission pinions being mounted to move simultaneously at the same rate of speed, a plurality of controlling gears 24 30 35 of proportionate sizes, severally engaging a respective one of said transmission pinions, a braking device 41 for engagement with said transmission pinions, and with a selected one of said controlling gears, and a clutching device 76 carried by one of said controlling gears 35 for engagement with a second controlling gear 24, to lock the same together independent of the action of the braking device, substantially as described.

8. In a power transmission gearing, the combination with two or more brake drums of a band brake for engagement with a selected one of said drums and means for moving said brake in juxtaposition to said selected drum.

9. In a power transmission gearing, the combination with two or more brake drums of a band brake for engagement with a selected one of said drums, means for moving said brake in juxtaposition to said selected drum, and means for tightening said brake in any position thereof.

10. In a power transmission gearing, the combination with two or more brake drums of a rocking shaft, a sleeve slidable thereon and rotatable therewith, a band brake carried by said sleeve, means for sliding said sleeve in either direction upon said shaft and means for rocking said shaft to clamp said brake.

In testimony whereof I affix my signature in presence of two witnesses.

WILLIAM L. FODREA.

Witnesses:
A. G. BALDWIN,
CHAS. JUMP.